Oct. 10, 1939.  J. L. ENGLER  2,175,258

MAGNETO ROTOR CONSTRUCTION

Filed Feb. 3, 1938  2 Sheets-Sheet 1

INVENTOR
JOHN LEO ENGLER
BY Paul L. Kohler
ATTORNEY

Oct. 10, 1939.  J. L. ENGLER  2,175,258

MAGNETO ROTOR CONSTRUCTION

Filed Feb. 3, 1938   2 Sheets-Sheet 2

INVENTOR
JOHN LEO ENGLER
BY Paul L. Keehn
ATTORNEY

Patented Oct. 10, 1939

2,175,258

UNITED STATES PATENT OFFICE 2,175,258

MAGNETO ROTOR CONSTRUCTION

John Leo Engler, Beloit, Wis., assignor to Fairbanks, Morse & Co., Chicago, Ill., a corporation of Illinois Application February 3, 1938, Serial No. 188,415

7 Claims. (Cl. 171—209)

This invention relates to magneto rotor construction, and more particularly to an improved low cost rotor construction for magnetoelectric machines of so-called rotating field type.

The present invention has as its primary objective, the production of a more rugged, dependable, low-cost rotor for magnetos of the type referred to, characterized by a molded body portion which is die-cast in place with respect to the rotor shaft, magnet bars and pole shoes, serving to unite and maintain these members in rigid, permanently assembled relation.

Another object of the invention is directed to improving the efficiency and increasing the useful life of magneto rotors of the character described, by the provision of means which enable the magnet bars and pole shoes to be physically and magnetically connected together in an improved manner, resulting in a low reluctance junction therebetween.

Yet another object is attained in the provision of an improved rotor construction which effects substantial manufacturing economies by eliminating certain machining operations necessary in former constructions.

Figure 4:
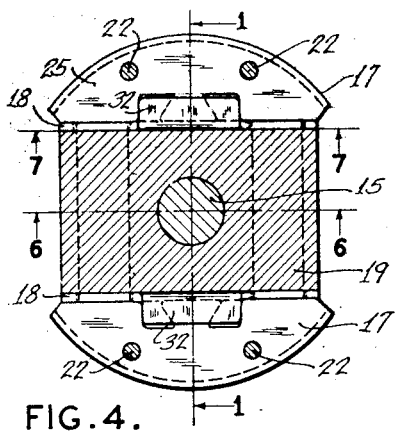
Figure 1:
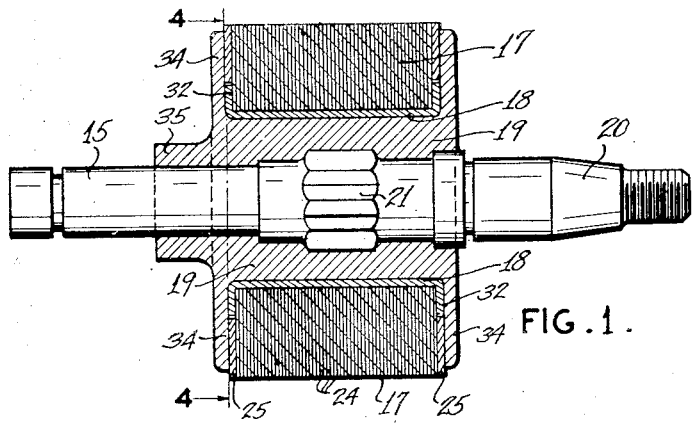
Figure 5:
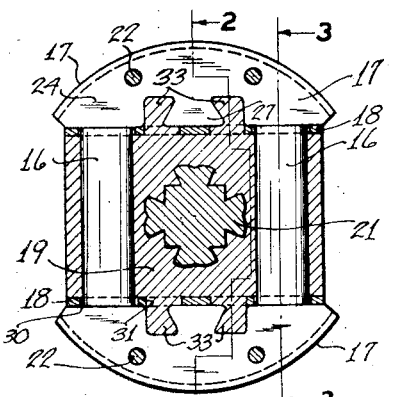
Figure 2:
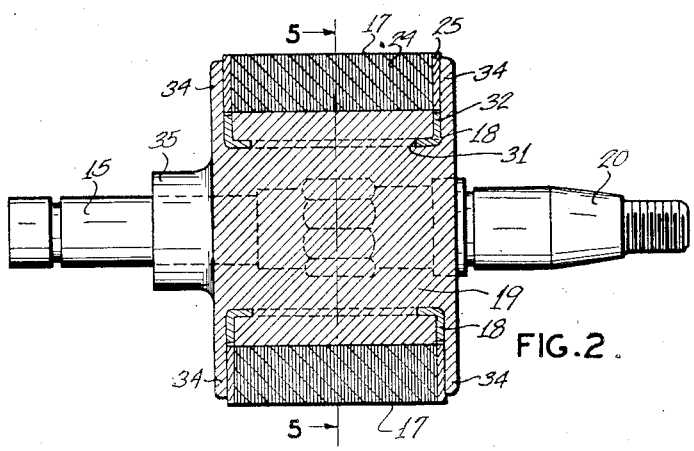
Figure 6:
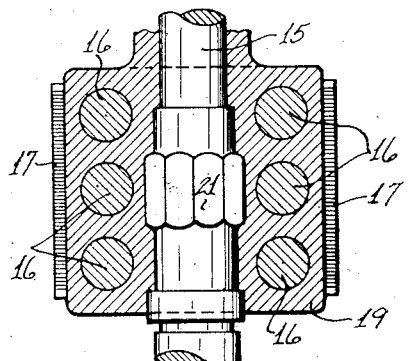
Figure 3:
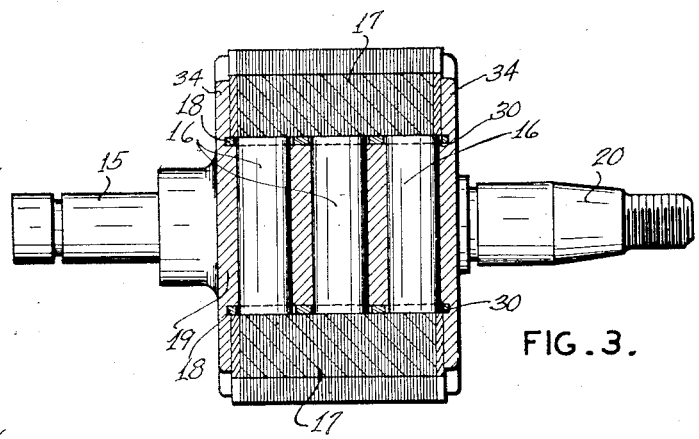
Figure 7:
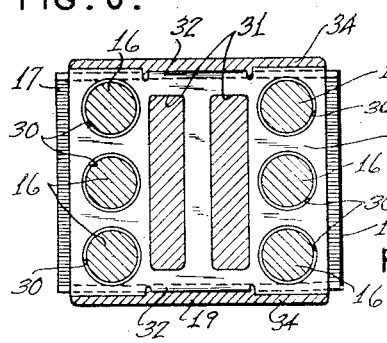
Figure 8:
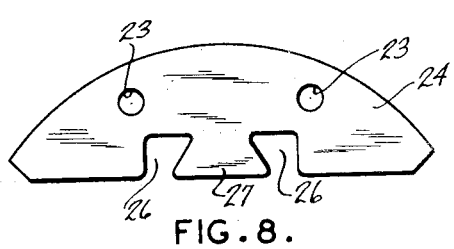
Figure 9:
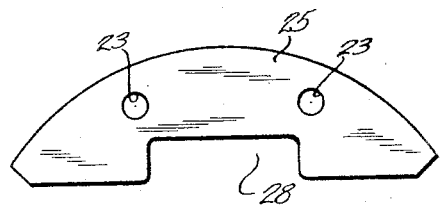
Figure 10:
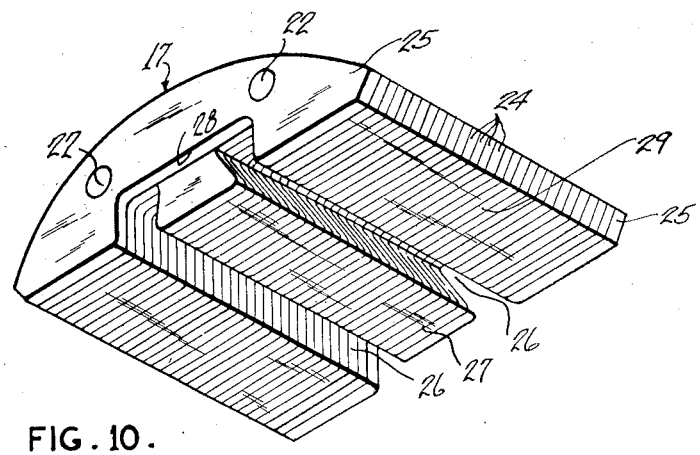
Figure 11:
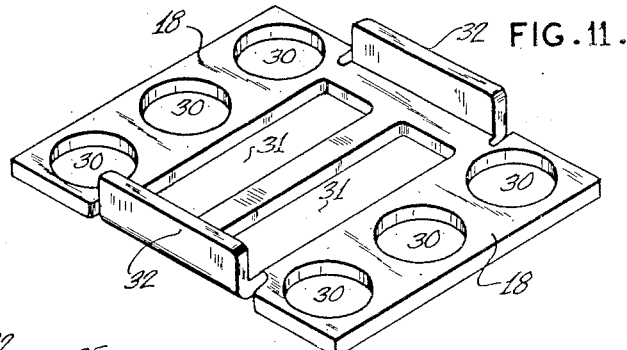
Figure 12:
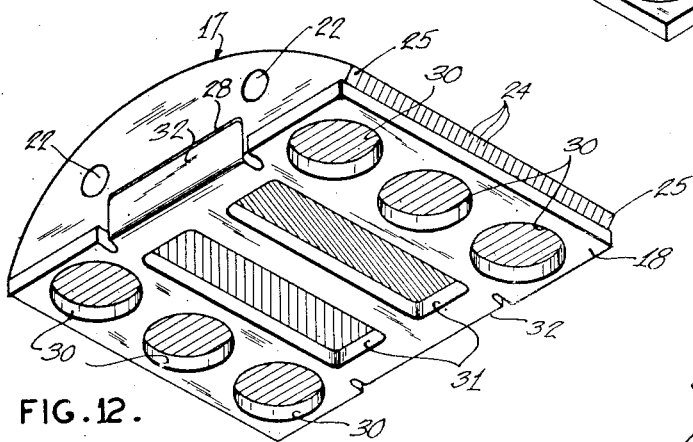

The foregoing and numerous other objects will appear as the description proceeds, when considered in connection with the accompanying drawings of a presently preferred embodiment of the invention. In the drawings: Fig. 1 is a sectional elevation of a rotor constructed in accordance with the present invention, the section being taken at a plane indicated by line 1—1 on Fig. 4; Figs. 2 and 3 are sectional elevations taken at lines 2—2 and 3—3, respectively, on Fig. 5; Fig. 4 is a transverse section of the device as it would appear when viewed along line 4—4 of Fig. 1; Fig. 5 is a transverse section as viewed along line 5—5 of Fig. 2; Figs. 6 and 7 are sectional plan views taken at lines 6—6 and 7—7, respectively on Fig. 4; Fig. 8 is a plan view of one of the pole shoe inner laminations; Fig. 9 is a plan view of one of the pole shoe end laminations; Fig. 10 is a perspective view of a pole shoe; Fig. 11 is a perspective view of a magnet bar retainer plate, and Fig. 12 is a perspective view of a pole shoe with the retainer plate assembled thereon.

Referring now by characters of reference to the drawings, my improved rotor comprises a shaft 15, magnet bars 16, pole shoes 17, retainer plates 18, and die-cast body portion 19. Shaft 15 is preferably threaded at one end for the reception of a gear or retaining nut (not shown), the shaft portion adjacent the threaded end being desirably tapered as indicated at 20 to accommodate and form a tapered fit with a coupling member (not shown) in case an impulse coupling is utilized. An intermediate portion 21 of the shaft is formed with irregular or angulate surfaces to provide firm anchorage for the molded body portion 19.

The pole shoes 17, disposed diametrially and peripherally on opposite sides of the rotor structure, are identical with respect to each other, each comprising a group of stacked laminations secured together in assembled relation by means of rivets 22 which extend transversely through perforations 23 formed therein. As best appears from Fig. 10, each pole shoe is made up of inner laminations 24 (Fig. 8), and end laminations 25 (Fig. 9), which distinguish from each other in their thickness (the end laminations 25 being preferably stamped from thicker stock than the inner laminations 24), and in the character of the recesses formed in their inner margins, but in other respects the inner and end laminations may be identical. The laminations 24 are provided with spaced recesses 26 which define dovetail tongue 27 therebetween, while the end laminations are formed each with a single recess 28 equal in shape and extent to the combined areas of recesses 26 and tongue 27. After the laminations are assembled and secured together by the rivets 22 in the formation of a pole shoe shown in Fig. 10, the inner surfaces 29 of the pole shoe are rendered flat and smooth, as by grinding, so as to effect good contact with the ends of the magnet bars, to be hereinafter described.

In the assembly presently described by way of illustration, the magnets 16 are of bar form and preferably circular in cross section, are six in number, and are arranged transversely of the axis of the rotor, three bars being disposed on each side of the rotor shaft. It is my preference to employ for the magnet bars, an alloy characterized by high coercive force and retentivity, among the materials particularly suitable for the purpose being certain of the alloys known as Alnico steel. It is important to have the end surfaces of the magnet bars flat, smooth, and at right angles to the axes of the bars, this being readily accomplished by a simple grinding operation.

The magnet bars 16 are positioned in their final assembly arrangement with respect to the pole shoes by means of the retainer plates 18, one of which is illustrated in Fig. 11. The retainer plates 18 are stamped from mild sheet steel and are shaped to conform, peripherally, with the inner surfaces of the pole shoes. The plates 18 are provided with circular perforations 30 for receiving the ends of the magnet bars, the perforations 30 being of slightly larger diameter than the bars to permit of a limited amount of lateral play therebetween. The plates are provided further with elongated recesses 31 which are adapted to register with the slots produced by the alined recesses 26 formed in the inner laminations 24. The bar retainers 18 are also provided with laterally projecting ears 32 which are adapted to fit into the recesses 28 formed in the end laminations 25, and bear tightly against the tongue portion 27 of the pole shoes, the ears 32 serving particularly to secure the bar retainers 18 to the pole shoes during the initial stages of assembly.

The parts thus far described are arranged in their final relative positions and the assemblage is then placed in a suitable die-casting mold which is adapted to support and maintain the rotor parts in their proper positions while the material which forms the body portions of the rotor is applied thereto. The body material may desirably consist of aluminum or an aluminum alloy, although other non-magnetic materials may be used. Sufficient body metal is forced into the mold to fill completely the space remaining between confronting surfaces of the pole shoes, including the spaces formed by the recesses 26. Thus, the body metal is caused to flow through the recesses 31 in the bar retainers 18, and into the pole shoe recesses 26, in the formation of tongues 33 (Fig. 5) which interlock with the tongue portions 27 of the pole shoes. The die-casting mold is preferably designed to allow the body metal to extend axially beyond and over the end surfaces of the pole shoes in the formation of circular end plate portions 34, and the production of a hub portion 35 on one of such end plates.

The body metal will contract slightly upon cooling and, acting through the interengaging tongues 27 and 33, causes the pole shoes to be drawn toward each other into tight surface engagement with ends of the magnet bars. Since the magnet bars are not held rigidly by the retainer plates, as heretofore mentioned, they are capable of a slight lateral shifting movement under the influence of the contracting body metal, and accordingly are not subjected to severe internal stresses such as would result if the ends of the magnets were rigidly held. The avoidance of shear and tension stresses in the magnet bars is especially desirable where those elements are formed of Alnico steel, an alloy which cracks readily when subjected to tension and shear stresses. Moreover, the slight amount of bar movement afforded by the over size retainer aperatures 30 permits of an accurate lap fit to be made between the mating surfaces of the magnet bars and pole shoes.

As the drawings of the preferred form of retainer plate indicate, only small, relatively weak necks of metal intervene the retainer plate apertures 30 and 31. Such neck portions are susceptible of deformation by the magnet bars as they are drawn laterally inwardly by the body metal as it shrinks during cooling, and this facility of the recess-forming portions of the retainer plate to yield under shrinking pressures tends further to obviate breakage of the magnet bars.

The magnet bars are arranged in polar correspondence, one pole shoe constituting the north pole, and the opposite pole shoe constituting the south pole of the rotor assembly. It is preferable to magnetize the bars simultaneously and after the same have been assembled and cast in place, since this eliminates the necessity of particularizing, during assembly, to assure the proper polar arrangement of the bars.

From the foregoing description it will appear that the retainer plates 18 serve to position the magnet bars during assembly in lieu of recesses formed directly in the pole shoes. Where magnet bars of circular section are utilized, such type being most desirable, it heretofore has been the practice to drill the inner faces of the pole shoes to form recesses for receiving the bar ends. The machining of holes in the pole shoes is a relatively expensive operation and does not enable a satisfactory surface lap fit to be made between the magnet bars and shoes which is necessary in order to minimize the magnetic reluctance of the junction. The grinding of the mating surfaces of the pole shoes and magnet bars is the only machining operation necessary to insure an accurate fit between these members, and such operation is relatively simple and inexpensive.

Although the invention has been described by making detailed reference to a specific embodiment of the invention selected for purposes of patent disclosure, this description is to be understood entirely in a descriptive sense, and not with any limitations in meaning, except such as may be imposed by the claims hereunto appended.

I claim as my invention:

1. A rotor for magnetos of rotating field type including a pair of spaced, oppositely disposed pole shoes. magnet bars extending transversely between the pole shoes, apertured plates mounted on the inner faces of said pole shoes for positioning said magnet bars relative thereto during assembly, said bars projecting through the plate apertures and having their end surfaces flush with the inner faces of the pole shoes, a rotor shaft extending centrally between the pole shoes and magnet bars, and a body of molded, non-magnetic material rigidly uniting the pole shoes, magnet bars and shaft.

2. In a rotor for magnetos of rotating field type, a shaft member defining an axis of rotor revolution, a magnet bar at each side of the rotor axis, extending transversely thereto, a pair of oppositely disposed pole shoes of laminated construction having their inner faces flush with the end faces of the magnet bars, elements mounted on the pole shoes having apertures to receive and position the magnet bars relative to each other and to the pole shoes during assembly, and a die-cast body of non-magnetic material constituting a holder or cage serving to retain the magnet bars and pole shoes in assembled relation to the shaft.

3. In a rotor for a magneto of rotating field type, a shaft, a pair of laminated pole shoes spaced on opposite sides of the shaft, said shoes having under-cut recesses formed in their confronting surfaces, apertured plates mounted on the pole shoes adjacent the confronting surfaces thereof, a plurality of magnet bars extending transversely of the shaft, having their ends projecting through certain of the plate apertures and their end surfaces in abutting engagement with the pole shoes, a metal body molded in place between the pole shoes and about the shaft and magnet bars, said body having integral portions thereof projecting through certain of the plate apertures and interlocking with the pole shoes at said pole shoe recesses.

4. In a rotor for a magneto of rotating field type including a shaft, a plurality of magnet bars symmetrically spaced on opposite sides of the shaft and extending transversely thereto, a pair of laminated pole shoes having flat inner faces abutting the opposite ends of the magnet bars, an apertured plate attached to each pole shoe, forming sockets for receiving and positioning the ends of the magnet bars during assembly, and a molded metal body cast in place about the shaft and magnet bars, said body having integral portions disposed in interlocking relation with the pole shoes, said body serving to maintain the pole shoes in tight abutting engagement with the magnet bars.

5. In a rotor for a magneto of rotating field type, a shaft, a pair of laminated pole shoes spaced on opposite sides of the shaft and having flat confronting inner faces, apertured plates mounted adjacent the inner faces of the pole shoes, providing sockets thereon for receiving and positioning the ends of magnet bars, means attaching said plates to their associated pole shoes, a plurality of magnet bars symmetrically arranged on opposite sides of the shaft, said bars projecting through the plate apertures and having their end surfaces flush with the inner faces of the pole shoes, and a molded metal body cast in place about the shaft and substantially filling the space between said pole shoes, portions of said body extending through said plates and engaging the pole shoes, said body serving to maintain the shaft, pole shoes, and magnet bars in rigid assembled relation.

6. A magneto rotor comprising a shaft, a pair of laminated pole shoes spaced on opposite sides of the shaft, said pole shoes having flat confronting faces, a plurality of magnet bars of circular section spaced on opposite sides of the shaft and extending at right angles thereto, the opposite end surfaces of said magnet bars being disposed flush, in abutting engagement with the confronting faces of the pole shoes, means serving to position the magnet bars with respect to each other and to the pole shoes during assembly, said means comprising plates mounted on the confronting faces of the pole shoes, apertured loosely to receive the ends of the magnet bars, a molded metal body cast in place about rotor shaft and substantially filling the space between the pole shoes, said body completely encasing the magnet bars and providing end-plate-forming portions embracing the opposite end surfaces of the pole shoes.

7. A rotor for magnetos of rotating field type, comprising a shaft defining an axis of rotor revolution, a pair of laminated pole shoes spaced on opposite sides of the shaft, said pole shoes having flat, parallel inner surfaces, axially extending undercut grooves spaced inwardly from the side edges of said surfaces, and recesses formed in the end faces of the pole shoes; plates mounted adjacent the inner surfaces of the pole shoes, said plates having circular apertures confronting the flat, inner surfaces of the pole shoes, openings registering with said pole shoe grooves, and end projections disposed in said pole shoe recesses serving to position the plates on said shoes; a plurality of bar magnets of circular section spaced on opposite sides of and at right angles to the rotor shaft, said magnets having their ends extending through the plate apertures and their end surfaces engaging the inner surfaces of the pole shoes; a body of molded, non-magnetic metal cast in place about the shaft, said body filling the space between the inner surfaces of the pole shoes and extending into the undercut grooves of the pole shoes for locking engagement therewith, said body serving rigidly to unite the pole shoes, magnet bars and shaft.

JOHN LEO ENGLER.